(12) United States Patent
Boutaghou

(10) Patent No.: US 6,359,758 B1
(45) Date of Patent: Mar. 19, 2002

(54) RIGID BODY MICROACTUATOR HAVING ELASTIC JOINT ATTACHMENT

(75) Inventor: Zine-Eddine Boutaghou, Vadnais Heights, MN (US)

(73) Assignee: Seagate Technology, LLC, Scotts Valley, CA (US)

( * ) Notice: Subject to any disclaimer, the term of this patent is extended or adjusted under 35 U.S.C. 154(b) by 0 days.

(21) Appl. No.: 09/288,257

(22) Filed: Apr. 8, 1999

Related U.S. Application Data
(60) Provisional application No. 60/089,135, filed on Jun. 11, 1998.

(51) Int. Cl.[7] .................................................. G11B 5/55
(52) U.S. Cl. ...................................................... 360/294.4
(58) Field of Search ............................... 360/294.4, 294

(56) References Cited

U.S. PATENT DOCUMENTS

| | | | |
|---|---|---|---|
| 3,678,482 A | 7/1972 | Billawala | 340/174.1 |
| 3,924,268 A | 12/1975 | McIntosh et al. | 360/78 |

(List continued on next page.)

FOREIGN PATENT DOCUMENTS

| | | |
|---|---|---|
| EP | 0 412 221 B1 | 11/1989 |
| JP | 63-122069 | 5/1988 |
| JP | 02-263369 | 4/1989 |
| JP | 04-134681 | 5/1992 |
| JP | 04-368676 | 12/1992 |
| JP | 05-094682 | 4/1993 |
| JP | 06-020412 | 1/1994 |
| JP | 07-085621 | 3/1995 |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

(List continued on next page.)

*Primary Examiner*—George J. Letscher
(74) *Attorney, Agent, or Firm*—Kinney & Lange, P.A.

(57) ABSTRACT

An assembly and method for finely positioning a slider carrying a transducing head with respect to a selected track of a rotatable disc includes a suspension load beam having a proximal end connected to an actuator arm and a distal end for applying pre-load force to the slider. A flexure has a first end and second end, the second end supporting the slider. A compliant joint attaches the first end of the flexure to the suspension load beam between the proximal end and the distal end. A high resolution microactuator is operatively coupled to the flexure and the suspension load beam to deform the compliant joint and thereby effect rigid body movement of the flexure with respect to the suspension load beam upon operation of the motor. Alternatively, the compliant joint may be provided to attach the proximal end of the suspension load beam to the actuator arm, and the microactuator motor may by operatively coupled to the actuator arm and the suspension load beam to deform the compliant joint and thereby effect rigid body motion of the suspension load beam with respect to the actuator arm upon operation of the motor.

15 Claims, 7 Drawing Sheets

U.S. PATENT DOCUMENTS

| | | | |
|---|---|---|---|
| 4,374,402 A | * 2/1983 | Blessom et al. | 360/104 |
| 4,605,977 A | 8/1986 | Matthews | 360/103 |
| 4,620,251 A | 10/1986 | Gitzendanner | 360/103 |
| 4,651,242 A | 3/1987 | Hirano et al. | 360/103 |
| 4,764,829 A | 8/1988 | Makino | 360/106 |
| 4,853,810 A | 8/1989 | Pohl et al. | 360/103 |
| 4,914,725 A | 4/1990 | Belser et al. | 318/560 |
| 5,021,906 A | 6/1991 | Chang et al. | 360/103 |
| 5,034,828 A | 7/1991 | Ananth et al. | 360/75 |
| 5,065,268 A | 11/1991 | Hagen | 360/104 |
| 5,079,659 A | 1/1992 | Hagen | 360/104 |
| 5,105,408 A | 4/1992 | Lee et al. | 369/44.15 |
| 5,177,652 A | 1/1993 | Yamaguchi et al. | 360/78.05 |
| 5,189,578 A | 2/1993 | Mori et al. | 360/106 |
| 5,255,016 A | 10/1993 | Usui et al. | 346/140 |
| 5,276,573 A | 1/1994 | Harada et al. | 360/103 |
| 5,303,105 A | 4/1994 | Jorgenson | 360/106 |
| 5,521,778 A | 5/1996 | Boutaghou | 360/106 |
| 5,552,809 A | 9/1996 | Hosono et al. | 347/10 |
| 5,623,461 A | 4/1997 | Sohmuta | 369/32 |
| 5,657,188 A | 8/1997 | Jurgenson et al. | 360/106 |
| 5,745,319 A | 4/1998 | Takekado et al. | 360/78.05 |
| 5,764,444 A | 6/1998 | Imamura et al. | 360/109 |
| 5,781,381 A | 7/1998 | Koganezawa et al. | 360/106 |
| 5,793,571 A | 8/1998 | Jurgenson et al. | 360/104 |
| 5,796,558 A | 8/1998 | Hanrahan et al. | 360/106 |
| 5,805,382 A | 9/1998 | Lee et al. | 360/104 |
| 5,867,347 A | 2/1999 | Knight et al. | 360/104 |
| 5,896,246 A | 4/1999 | Budde et al. | 360/104 |
| 5,898,541 A | 4/1999 | Boutaghou et al. | 360/109 |
| 6,069,771 A | * 5/2000 | Boutaghou et al. | 360/104 |

OTHER PUBLICATIONS

"A Flexural Piggyback Milli–Actuator for Over 5 Gbit/in$^2$ Density Magnetic Recording" by Koganezawa et al, *IEEE Transactions on Magnetics*, vol. 32, No. 5, Sep. 1996.

"Transverse Mode Electrostatic Microactuator for MEMS-Based HDD Slider" by Imamura et al, *IEEE* 1996.

"An Experiment for Head Positioning System Using Sub-micron Track–width GMR Head" by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advance Information Storage Systems*, vol. 5, pp. 119–125.

"A Dual–Stage Magnetic Disk Drive Actuator Using a Piezoelectric Device for a High Track Density" by Mori et al., *IEEE Transactions on Magnetics*, vol. 27, No. 6, Nov. 1991.

"Dynamic Loading Criteria for 3–1/2 Inch Inline HDD Using Multilayer Piezoelectric Load/Unload Mechanism" by Kajitani et al., *IEEE Transactions on Magnetics*, vol. 27, No. 6, Nov. 1991.

"Design, Fabrication, and Testing of Silicon Microgimbals for Super–Compact Rigid Disk Drives" by Temesvary et al., *Journal of Microelectromechanical Systems*, vol. 4, N.

* cited by examiner

RIGID BODY MICROACTUATOR HAVING ELASTIC JOINT ATTACHMENT

CROSS-REFERENCE TO RELATED APPLICATION(S)

This application claims priority from Provisional Application No. 60/089,135 filed Jun. 11, 1998 by Z. Boutaghou, entitled "HGA BASED MICRO-ACTUATOR DESIGN WITH ELASTIC/FLEXIBLE JOINT."

BACKGROUND OF THE INVENTION

The present invention relates to a disc drive microactuator, and more particularly to a high resolution head positioning mechanism having a compliant joint serving as a center of rotation to enable rigid body motion of the system.

The density of concentric data tracks on magnetic discs continues to increase (that is, the size of data tracks and radial spacing between data tracks are decreasing), requiring more precise radial positioning of the head. Conventionally, head positioning is accomplished by operating an actuator arm with a large-scale actuation motor, such as a voice coil motor, to radially position a head on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

One promising design for high resolution head positioning involves employing a high resolution microactuator in addition to the conventional lower resolution actuator motor, thereby effecting head positioning through dual-stage actuation. Various microactuator designs have been considered to accomplish high resolution head positioning. However, many of these designs require deformation of the disc drive flexure or load beam to achieve small displacement of the head.

While these microactuators do preserve many of the manufacturing processes currently in existence by utilizing standard components, additional bending modes are generated in the load beam that have a negative effect on the performance of the microactuator and the associated servo control system that controls the movement of the microactuator. In order to accommodate the additional bending modes of the load beam, it is necessary to redesign the servo system to have substantially greater bandwidth, which requires significant additional design time and expense. In addition, the forces required to bend the stainless steel components of the disc drive, such as the load beam, are relatively high in relation to the size constraints of the microactuator. Therefore, there are significant design challenges to overcome in order to implement a microactuator that provides the requisite force to bend the load beam, which adds time and expense to the design process, and limits the range of technologies that maybe employed to realize the microactuator.

There is a need in the art for an effective disc drive microactuator design that utilizes rigid body motion of disc drive structures such as the gimbal and load beam in order to microposition the transducing head over a selected track of the rotating disc.

BRIEF SUMMARY OF THE INVENTION

The present invention is an assembly and method for finely positioning a slider carrying a transducing head with respect to a selected track of a rotatable disc in a disc drive system. The disc drive system includes a movable actuator arm to effect coarse positioning of the slider. A suspension load beam has a proximal end connected to an actuator arm and a distal end for applying pre-load force to the slider. A flexure has a first end and second end, the second end supporting the slider. A compliant joint attaches the first end of the flexure to the suspension load beam between the proximal end and the distal end. A high resolution microactuator is operatively coupled to the flexure and the suspension load beam to deform the compliant joint and thereby effect rigid body movement of the flexure with respect to the suspension load beam upon operation of the motor. Alternatively, the compliant joint may be provided to attach the proximal end of the suspension load beam to the actuator arm, and the microactuator motor may by operatively coupled to the actuator arm and the suspension load beam to deform the compliant joint and thereby effect rigid body motion of the suspension load beam with respect to the actuator arm upon operation of the motor.

DETAILED DESCRIPTION

Figure 1:
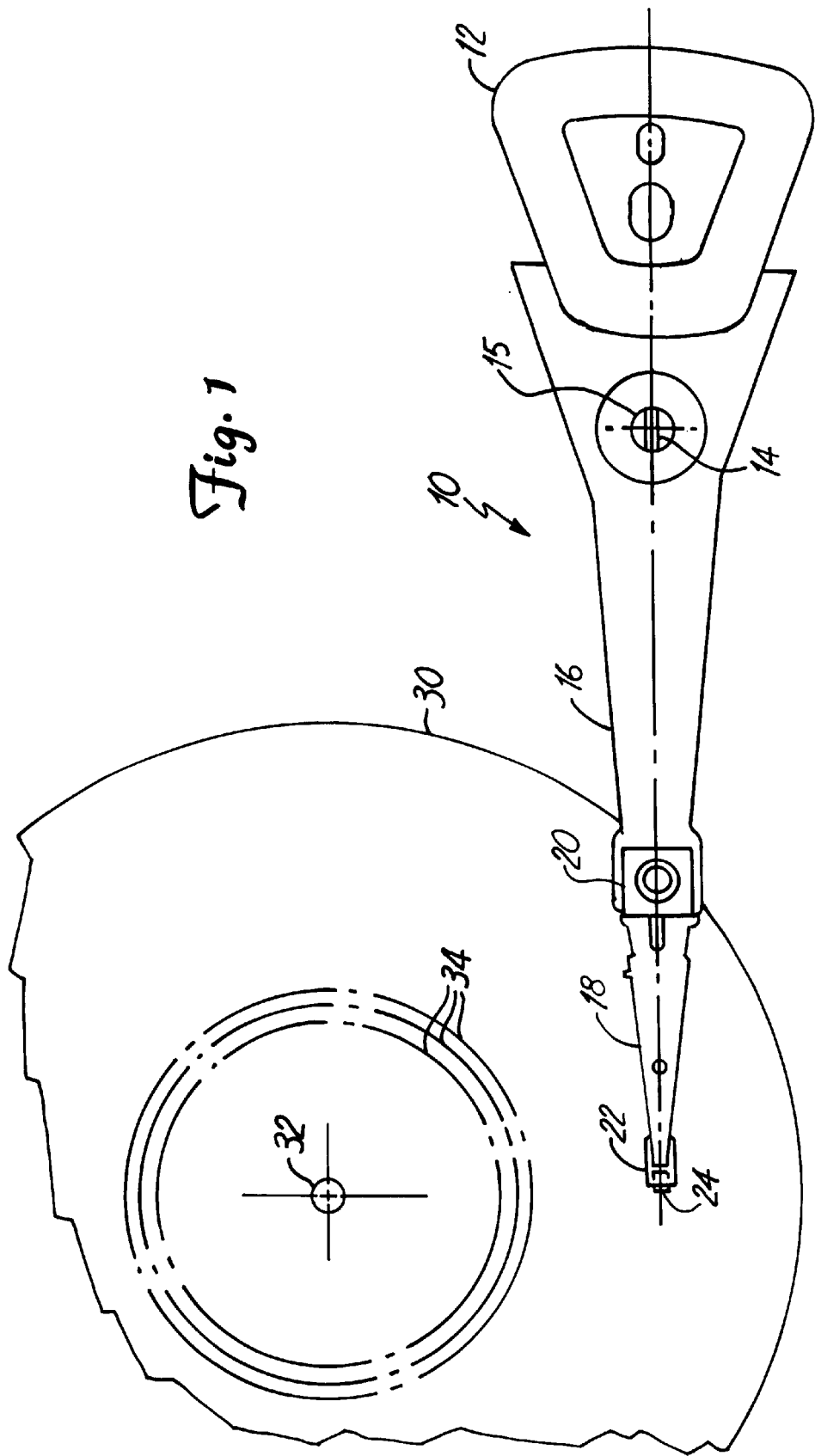
FIG. 1 is a top view of a disc drive actuation system for positioning a slider over tracks of a disc.

FIG. 1 is a top view of a disc drive actuation system 10 for positioning slider 24 over a track 34 of disc 30. Actuation system 10 includes voice coil motor (VCM) 12 arranged to rotate actuator arm 16 around axis 14 on spindle 15. Head suspension 18 is connected to actuator arm 16 at head mounting block 20. Flexure 22 is connected to an end of head suspension 18 and carries slider 24. Slider 24 carries a transducing head (not shown in FIG. 1) for reading and/or writing data on concentric tracks 4 of disc 30. Disc 30 rotates around axis 32, so that windage is encountered by slider 24 to keep it aloft a small distance above the surface of disc 30. Actuator arm 16, head suspension 18 and flexure 22 provide a support structure for maintaining slider 24 in proximity with the surface of disc 30.

VCM 12 is selectively operated to move actuator arm 16 around axis 14, thereby moving slider 24 between tracks 34 of disc 30. However, for disc drive systems with high track density, VCM 12 lacks sufficient resolution and frequency response to position a transducing head on slider 24 over a selected track 34 of disc 30. Therefore, a higher resolution actuation device is necessary.

Figure 2:
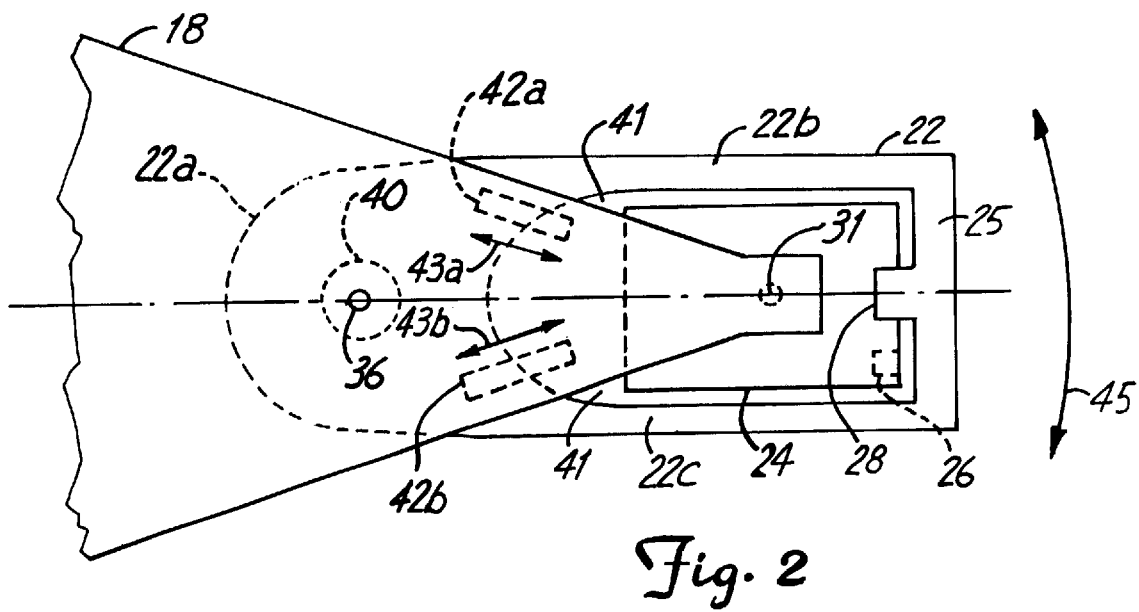
FIG. 2 is a top view.
Figure 3:
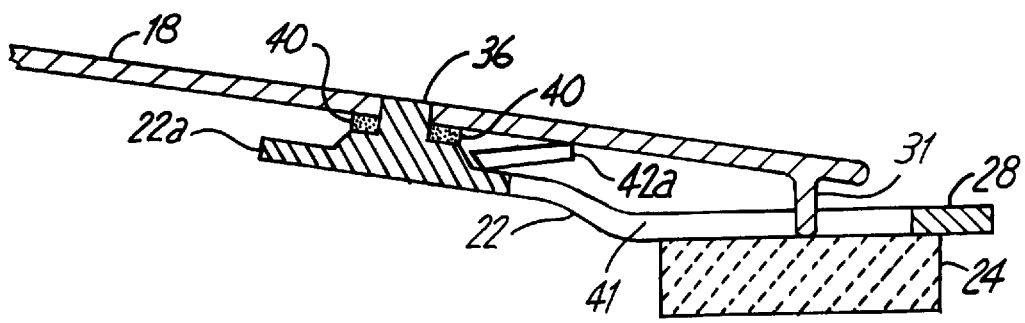
FIG. 3 is a side section view along the longitudinal axis, of a microactuator design according to a first embodiment of the present invention.

FIG. 2 is a top view, and FIG. 3 is a side section view along the longitudinal axis, of a microactuator design according to a first embodiment of the present invention. Flexure 22 includes body portion 22a and arm portions 22b and 22c that meet at end beam 25 to define aperture 41. Flexure 22 is attached to slider 24 by tongue 28 extending into aperture 41 from end beam 25. Load beam 18 applies pre-load force to slider 24 at load point 31 to force head 26 on slider 24 into close proximity with the surface of the disc in operation of the disc drive.

Flexure 22 is attached to load beam 18 at post 36 extending through an aperture in load beam 18. In order to provide enough flexibility for flexure 22 to move relative to load beam 18 without bending of flexure 22, elastic joint 40 is provided around post 36 between body portion 22a of flexure 22 and load beam 18, as shown in FIG. Piezoelectric elements 42a and 42b are attached between body portion 22a of flexure 22 and load beam 18 as well, and are deformable in response to control signals to expand or contract and thereby change in shape. Complementary expansion and contraction of piezoelectric elements 42a and 42b in the direction of arrows 43a and 43b generates force which causes elastic deformation in the form of shearing of elastic joint 40, resulting in rotational rigid body movement of flexure 22 around post 36 in the direction of arrows 45.

Figure 4:
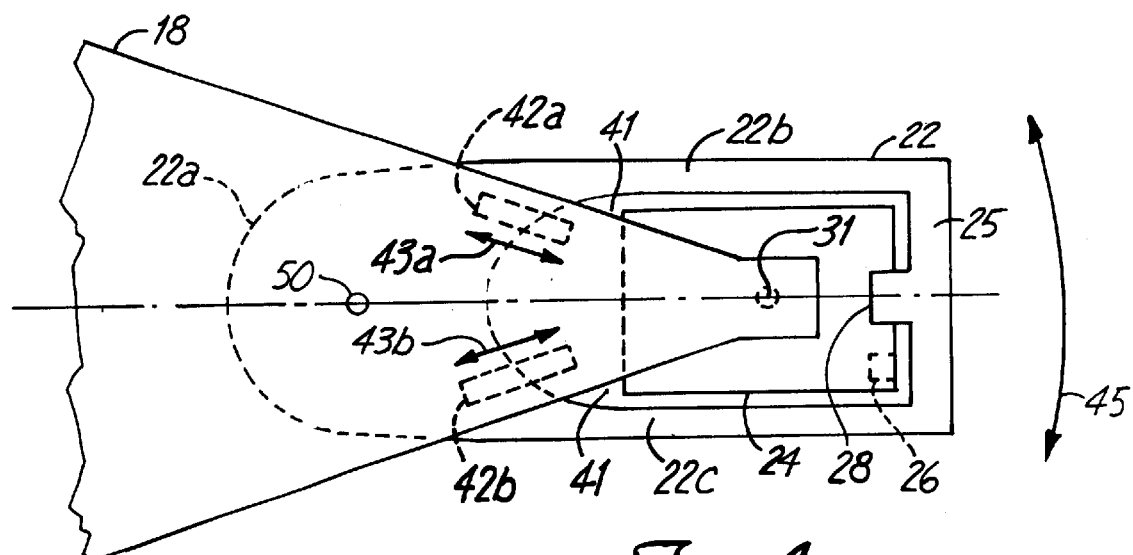
FIG. 4 is a top view.
Figure 5:
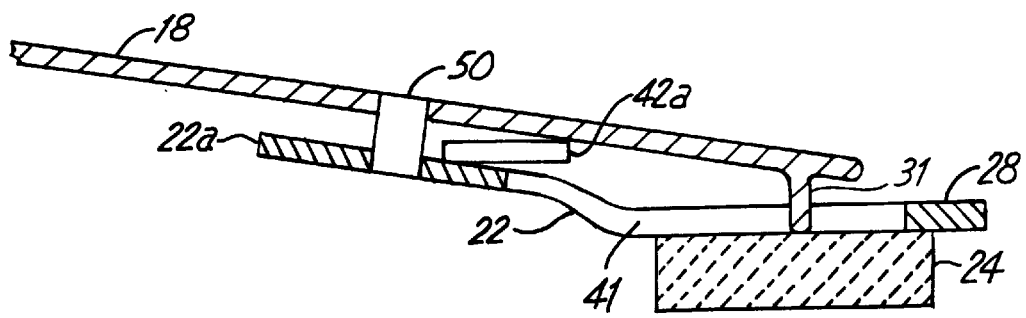
FIG. 5 is a side section view along the longitudinal axis, of a microactuator design according to a second embodiment of the present invention.

FIG. 4 is a top view, and FIG. 5 is a side section view along the longitudinal axis, of a microactuator design according to a second embodiment of the present invention. Flexure 22 includes body portion 22a and arm portions 22b and 22c that meet at end beam 25 to define aperture 41. Flexure 22 is attached to slider 24 by tongue 28 extending into aperture 41 from end beam 25. Load beam 18 applies pre-load force to slider 24 at load point 31 to force head 26 on slider 24 into close proximity with the surface of the disc in operation of the disc drive.

Flexure 22 is attached to load beam 18 by compliant post 50 extending through apertures in load beam 18 and flexure 22. Compliant post 50 is preferably formed of a polymeric substance, or another similarly compliant material, and is rigidly attached to load beam 18 and flexure 22. Piezoelectric elements 42a and 42b are attached between body portion 22a of flexure 22 and load beam 18 as well, and are deformable in response to control signals to expand or contract and thereby change in shape. Complementary expansion and contraction of piezoelectric elements 42a and 42b in the direction of arrows 43a and 43b generates force which causes elastic deformation of compliant post 50, resulting in rotational rigid body movement of flexure 22 around post 50 in the direction of arrows 45.

Figure 6:
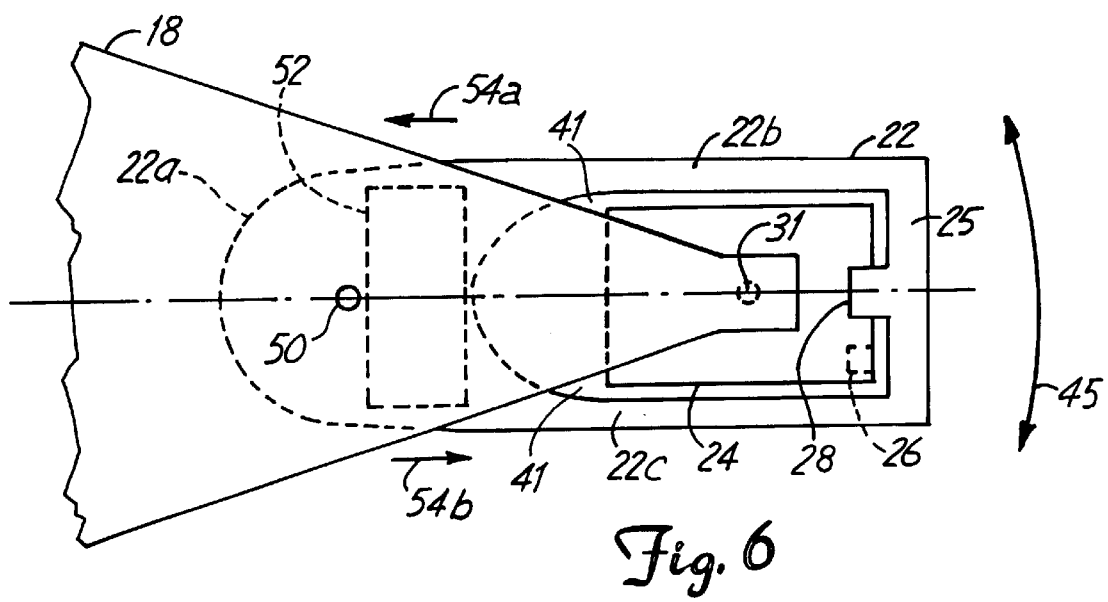
FIG. 6 is a top view.
Figure 7:
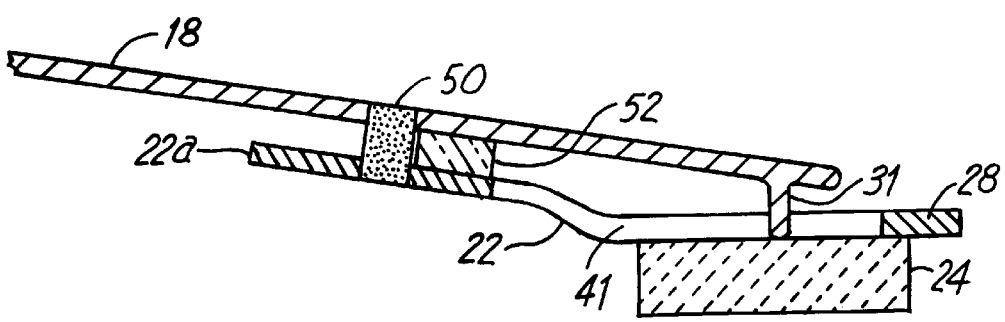
FIG. 7 is a side section view along the longitudinal axis, of a microactuator design according to a third embodiment of the present invention.

FIG. 6 is a top view, and FIG. 7 is a side section view along the longitudinal axis, of a microactuator design according to a third embodiment of the present invention. Flexure 22 includes body portion 22a and arm portions 22b and 22c that meet at end beam 25 to define aperture 41. Flexure 22 is attached to slider 24 by tongue 28 extending into aperture 41 from end beam 25. Load beam 18 applies pre-load force to slider 24 at load point 31 to force head 26 on slider 24 into close proximity with the surface of the disc in operation of the disc drive.

Flexure 22 is attached to load beam 18 by compliant post 50 extending through apertures in load beam 18 and flexure 22. Compliant post 50 is preferably composed of a polymeric substance or another similarly compliant material, and is rigidly attached to load beam 18 and flexure 22. Piezoelectric element 52 is attached between load beam 18 and body portion 22a of flexure 22 as well. In an exemplary embodiment, piezoelectric element 52 is a G5PZT element having a mode of deformation such that the material is sheared in opposite directions indicated by arrows 54a and 54b, thereby changing the shape of piezoelectric element 52. This shearing generates force which causes elastic deformation of compliant post 50, resulting in rotational rigid body movement of flexure 22 around post 50 in the direction of arrows 45.

Figure 8:
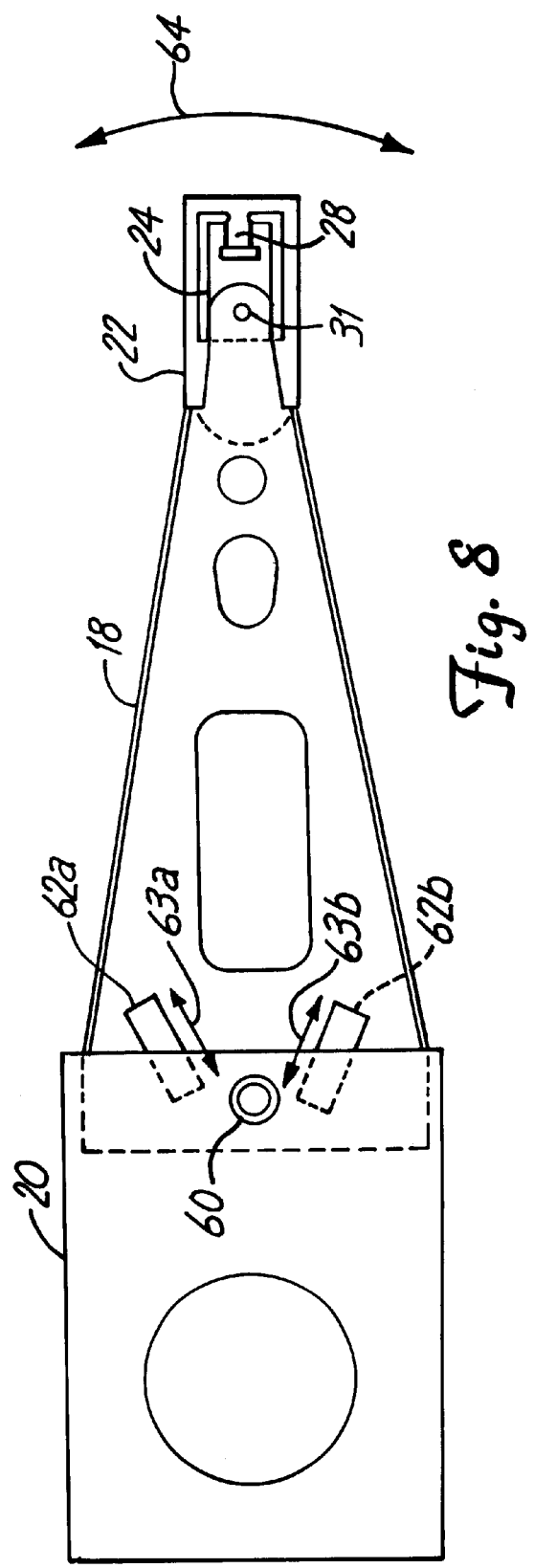
FIG. 8 is a top view of a microactuator design according to a fourth embodiment of the present invention.

FIG. 8 is a top view of a microactuator design according to a fourth embodiment of the present invention. Flexure 22 is attached to slider 24 by tongue 28 at a distal end of flexure 22. Load beam 18 applies pre-load force to slider 24 at load point 31 to force slider 24 into close proximity with the surface of the disc in operation of the disc drive.

In the embodiment shown in FIG. 8, the compliant connection joint is located between load beam 18 and head mounting block 20. Specifically, elastic joint 60 connects load beam 18 to head mounting block 20, and piezoelectric elements 62a and 62b are also attached between load beam 18 and head mounting block 20, and are deformable in response to control signals to expand or contract and thereby change in shape. Complementary expansion and contraction of piezoelectric elements 62a and 62b in the direction of arrows 63a and 63b generate force which causes elastic deformation of compliant joint 60, resulting in rotational rigid body movement of load beam 18 around joint 60 in the direction of arrows 64.

The elastic joint described above may be fabricated by any of a number of processes. One straightforward approach is to simply add a compliant adhesive layer or an adhering sandwich layer between flexure 22 and suspension 18. Attachment of the compliant adhesive may for example be achieved by a hot melt process, a bonding procedure, and injection process, or other processes known in the art. In the embodiment shown in FIGS. 2 and 3, post 36 may be formed in flexure 22 by stamping, molding, or another metal fabrication technique known in the art. It therefore may be appreciated that the present invention may be realized by simple fabrication techniques that do not add significant expense or complexity to the manufacturing process.

Figure 9:
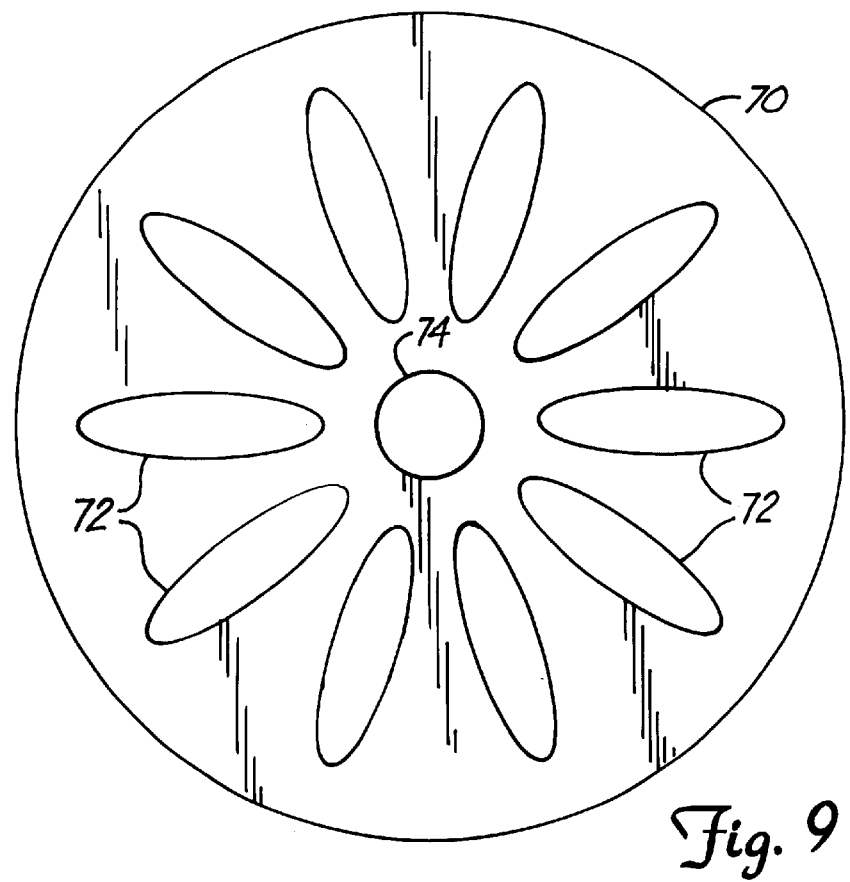
FIG. 9 is a top view of a compliant joint for use in a fifth embodiment of the present invention.
Figure 10:
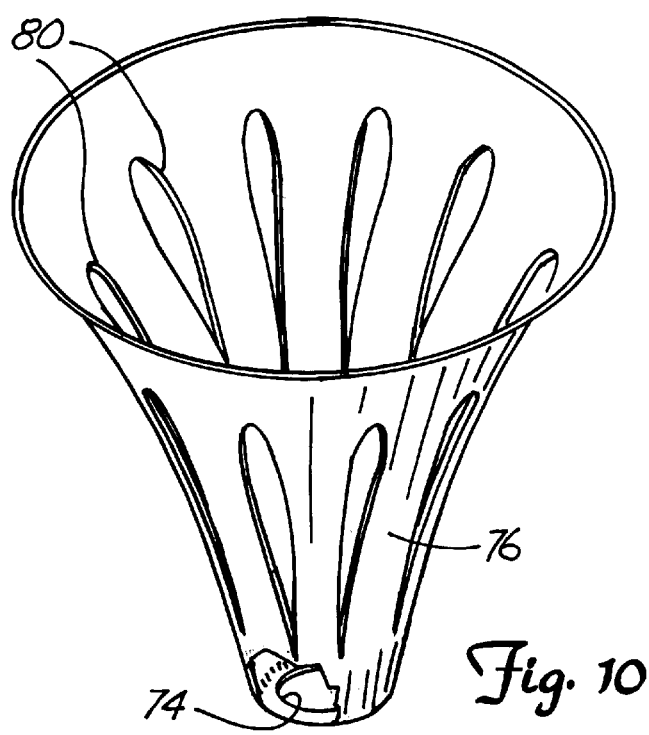
FIG. 10 is a side perspective view of a compliant joint for use in the fifth embodiment of the present invention.

FIG. 9 is a top view of a compliant joint for use with a microactuator design according to a fifth embodiment of the present invention. The compliant joint is formed from an initially flat stainless steel disc 70 having patterned apertures 72 center aperture 74. The center portion of disc 70 surrounding aperture 74 is forced downward while clamping the outer perimeter of disc 70, resulting in a generally cone-shaped joint 76 a side perspective view of which is shown in FIG. 10. Apertures 72 (FIG. 9) are deformed into apertures 80 of joint 76 shown in FIG. 10. Optionally, the center portion of disc 70 surrounding aperture 74 may be twisted while it is forced downward, thereby affecting the torsional stiffness of complaint joint 76 to achieve desired characteristics. In an exemplary embodiment, joint 76 is a component manufactured by DE-STA-CO Manufacturing of Troy, Mich.

Figure 11:
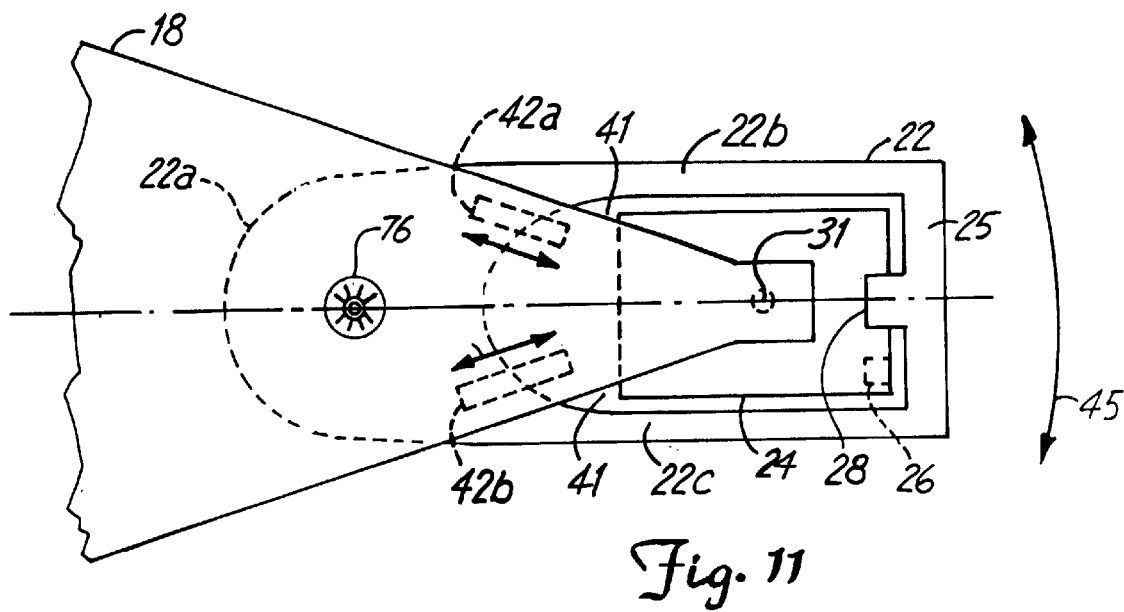
FIG. 11 is a top view.
Figure 12:
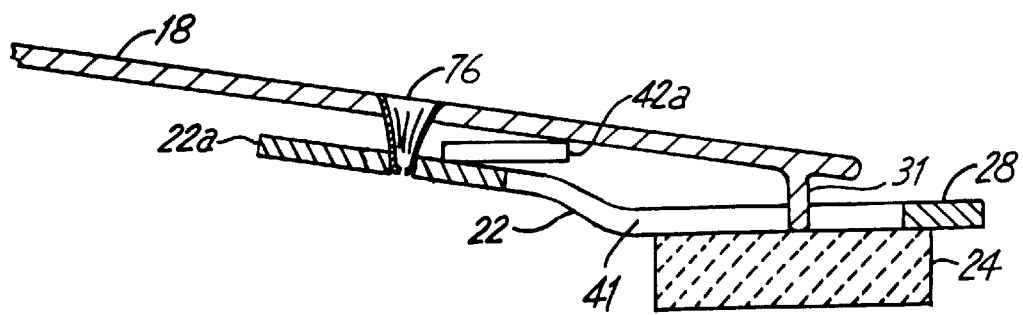
FIG. 12 is a side section view along the longitudinal axis, of a microactuator design according to the fifth embodiment of the present invention.

FIG. 11 is a top view, and FIG. 12 is a side section view along the longitudinal axis, of a microactuator design utilizing compliant joint 76 according to the fifth embodiment of the present invention. Flexure 22 includes body portion 22a and arm portions 22b and 22c that meet at end beam 25 to define aperture 41. Flexure 22 is attached to slider 24 by tongue 28 extending into aperture 41 from end beam 25. Load beam 18 applies pre-load force to slider 24 at load point 31 to force head 26 on slider 24 into close proximity with the surface of the disc in operation of the disc drive.

Flexure 22 is attached to load beam 18 by compliant joint 76 extending through apertures in load beam 18 and flexure 22. Compliant joint 76 is constructed as shown in FIGS. 9 and 10, and is rigidly attached to load beam 18 and flexure 22. Piezoelectric elements 42a and 42b are attached between body portion 22a of flexure 22 and load beam 18 as well, and are deformable in response to control signals to expand or contract and thereby change in shape. Complementary expansion and contraction of piezoelectric elements 42a and 42b in the direction of arrows 43a and 43b generates force which causes torsional deformation of compliant joint 76, resulting in rotational rigid body movement of flexure 22 around joint 76 in the direction of arrows 45.

The present invention provides a compliant joint connecting a suspension and a flexure of a disc drive, or between a suspension and an actuator arm of the disc drive, enabling a microactuator motor to finely position a transducing head by effecting rigid body motion of the disc drive structures through deformation of the compliant joint. By achieving micro-motion through deformation of the compliant joint rather than deformation of the actual disc drive structures such as the suspension and the flexure, additional vibrational modes of the assembly may be avoided, thereby ensuring the efficacy of the servo system to control the high resolution positioning of the head. In addition, the force from the microactuator motor required to achieve high resolution movements is reduced by the introduction of the compliant joint, which permits a greater variety of microactuator motor designs and materials to be used. Therefore, materials with lesser force characteristics and greater extension characteristics may be used according to the present invention, improving the range of motion of the microactuator. For example, memory alloy materials and polymer-based electrical materials may be used to provide larger displacements with lesser forces than traditional piezoelectric microactuator motors. Therefore, it should be understood that although the microactuator motors shown in the figures and described above are depicted as piezoelectric elements, other materials having appropriate displacement and force characteristics may also be utilized.

Although the present invention has been described with reference to preferred embodiments, workers skilled in the art will recognize that changes may be made in form and detail without departing from the spirit and scope of the invention.

What is claimed is:

1. An assembly for finely positioning a slider carrying a transducing head with respect to a selected track of a rotatable recording disc in a disc drive, the disc drive including a movable actuator arm to effect coarse positioning of the slider, the assembly comprising;
   a suspension load beam having a proximal end connected to the actuator arm and a distal end for applying pre-load force to the slider;
   a flexure having a first end and a second end, the second end supporting the slider;
   a compliant joint attaching the first end of the flexure to the suspension load beam between the proximal end and the distal end; and
   a high resolution microactuator motor operatively coupled to the flexure and the suspension load beam to deform the compliant joint and thereby effect rigid body movement of the flexure with respect to the suspension load beam upon operation of the motor.

2. The assembly of claim 1, wherein the compliant joint comprises:
   a post formed in the flexure to extend into an aperture in the suspension load beam; and
   a compliant material coupled between the flexure and the suspension load beam around the post.

3. The assembly of claim 1, wherein the compliant joint comprises a post composed of compliant material extending into a first aperture in the suspension load beam and into a second aperture in the flexure to connect the suspension load beam to the flexure.

4. The assembly of claim 1, wherein the microactuator motor comprises at least one piezoelectric element attached between the suspension load beam and the flexure, the piezoelectric element being configured to change in shape to apply force and thereby deform the compliant joint.

5. The assembly of claim 1, wherein the microactuator motor comprises at least one memory alloy material attached between the suspension load beam and the flexure, the memory alloy material being configured to change in shape to apply force and thereby deform the compliant joint.

6. The assembly of claim 1, wherein the microactuator motor comprises at least one polymer-based electrical material attached between the suspension load beam and the flexure, the polymer-based electrical material being configured to change in shape to apply force and thereby deform the compliant joint.

7. The assembly of claim 1, wherein the compliant joint comprises a generally cone-shaped piece attached between the suspension load beam and the flexure, the generally cone-shaped piece having a plurality of apertures extending therethrough.

8. A method of finely positioning a slider carrying a transducing head with respect to a selected track of a rotatable recording disc in a disc drive, the disc drive including a movable actuator arm to effect coarse positioning of the slider, a suspension load beam connected to the actuator arm and a flexure supporting the slider over a surface the disc, the method comprising:
   providing a compliant joint to attach the suspension load beam to the flexure;
   providing a microactuator motor operatively connected between the suspension load beam and the flexure; and
   changing the shape of the microactuator motor to deform the compliant joint and thereby effect rigid body movement of the flexure with respect to the suspension load beam.

9. The method of claim 8, wherein the step of providing a compliant joint comprises:
   forming an aperture in the suspension load beam;
   forming a post on the flexure extending into the aperture;
   attaching a compliant material between the suspension load beam and the flexure around the post.

10. The method of claim 8, wherein the step of providing a compliant joint comprises:
    forming a first aperture in the suspension load beam;
    forming a second aperture in the flexure; and
    attaching a compliant post to the suspension load beam in the first aperture and to the flexure in the second aperture.

11. The method of claim 8, wherein the step of providing a microactuator motor comprises attaching at least one piezoelectric element between the suspension load beam and the flexure.

12. The method of claim 8, wherein the step of providing a microactuator motor comprises attaching at least one memory alloy material between the suspension load beam and the flexure.

13. The method of claim 8, wherein the step of providing a microactuator motor comprises attaching at least one polymer-based electrical material between the suspension load beam and the flexure.

14. The method of claim 8, wherein the step of changing the shape of the microactuator motor comprises shearing of the microactuator motor.

15. An assembly for finely positioning a slider carrying a transducing head with respect to a selected track of a rotatable recording disc in a disc drive, the disc drive including a movable actuator arm to effect coarse positioning of the slider, the assembly comprising:

a suspension load beam having a proximal end and a distal end for applying pre-load force to the slider;

a flexure having a first end connected to the suspension load beam between the proximal end and the distal end, and a second supporting the slider;

a compliant joint attaching the proximal end of the suspension load beam to the actuator arm; and a high resolution microactuator motor operatively coupled to the suspension load beam and the actuator arm to deform the compliant joint and thereby effect rigid body movement of the suspension load beam with respect to the actuator arm upon operation of the motor.

\* \* \* \* \*